United States Patent Office 3,561,040
Patented Feb. 9, 1971

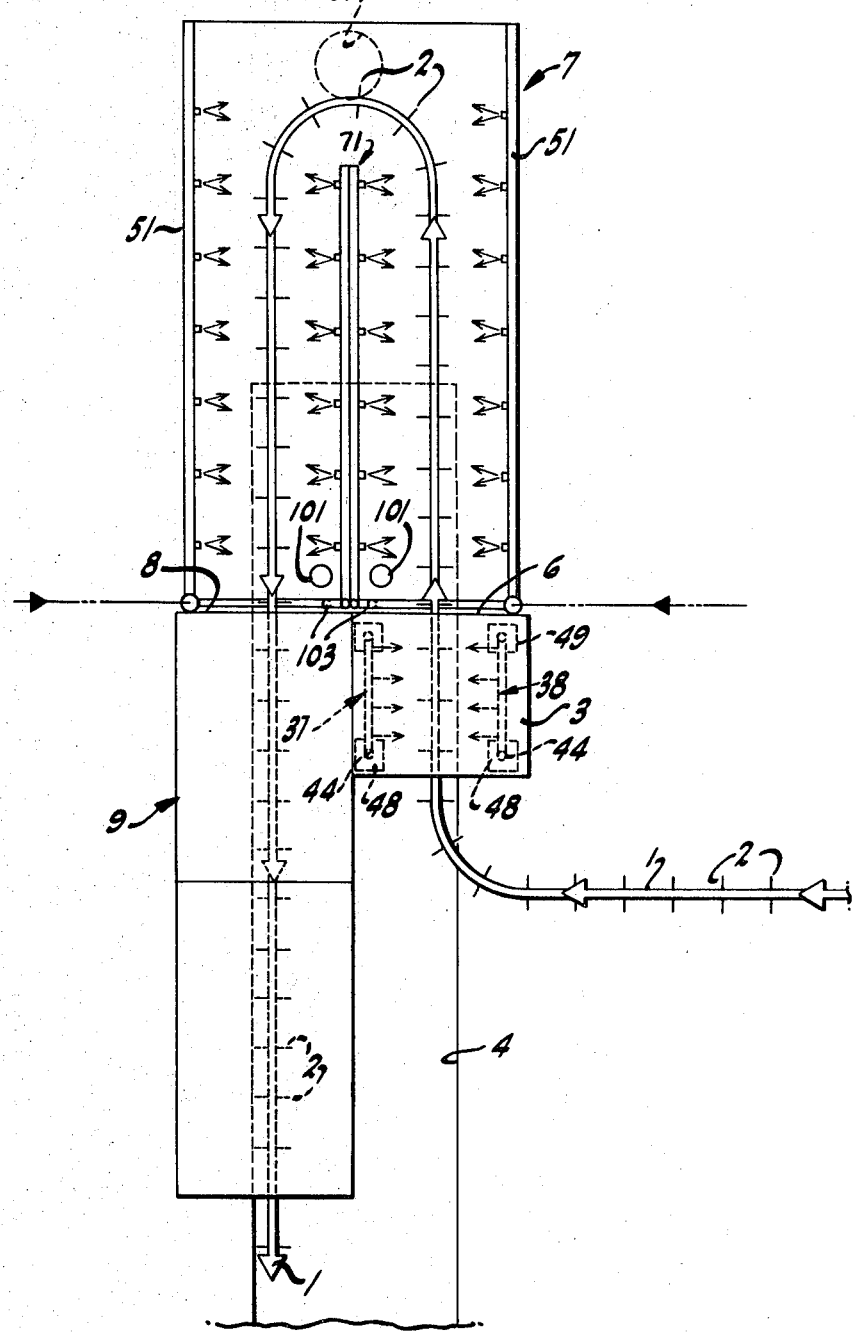

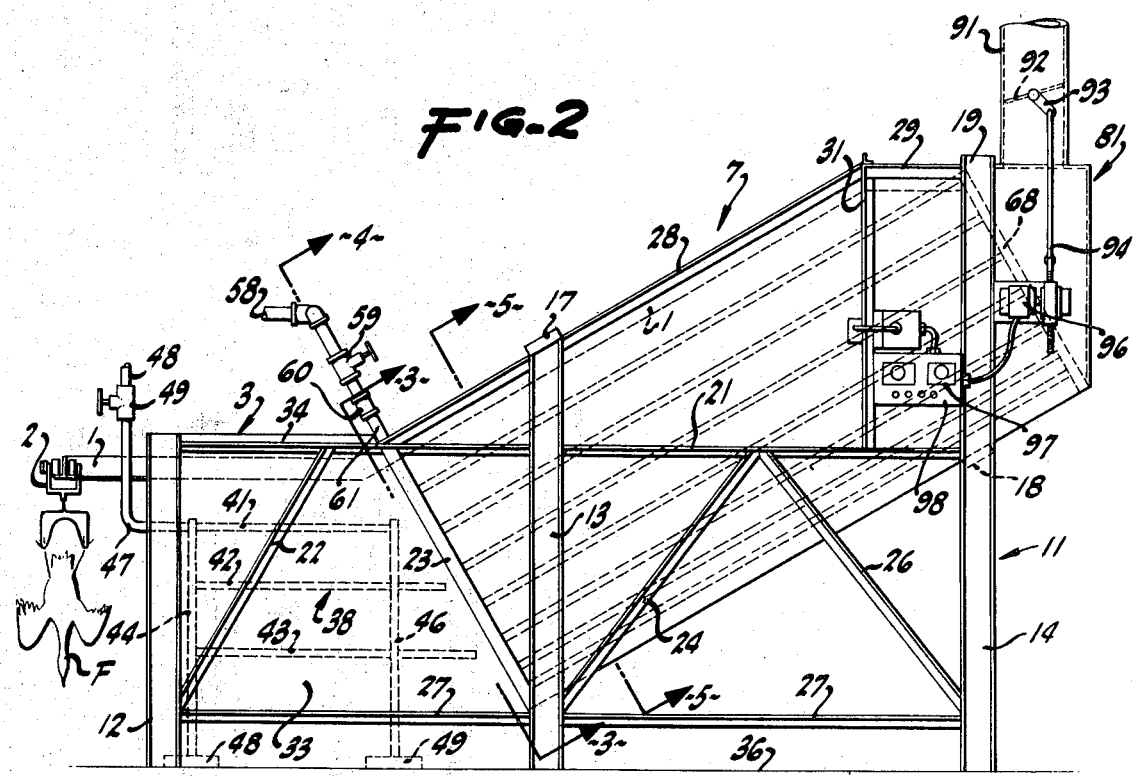
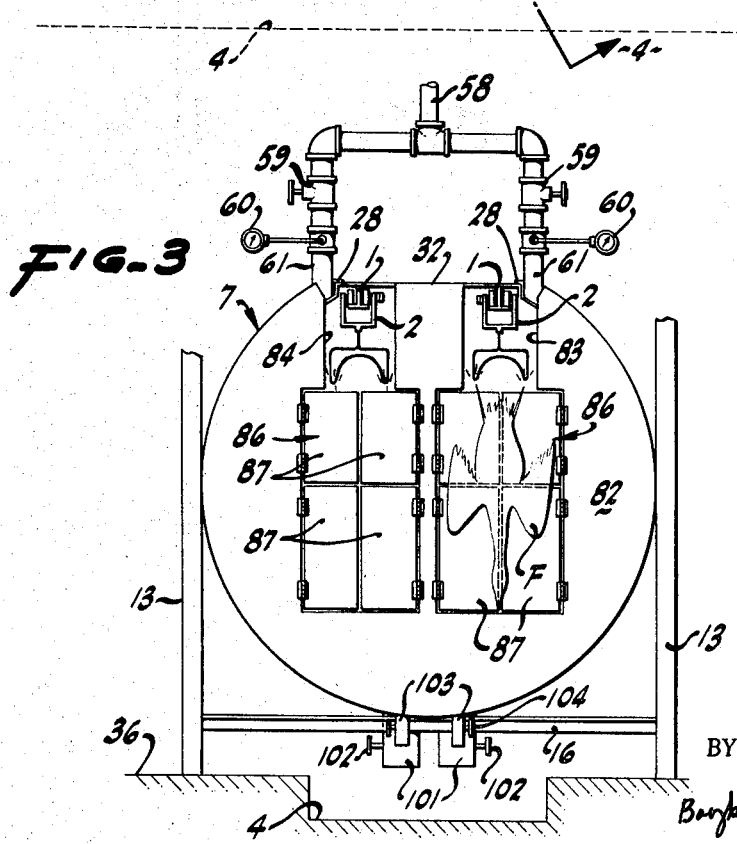
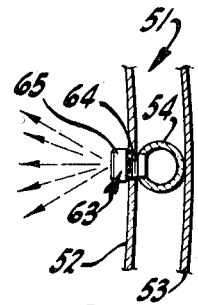

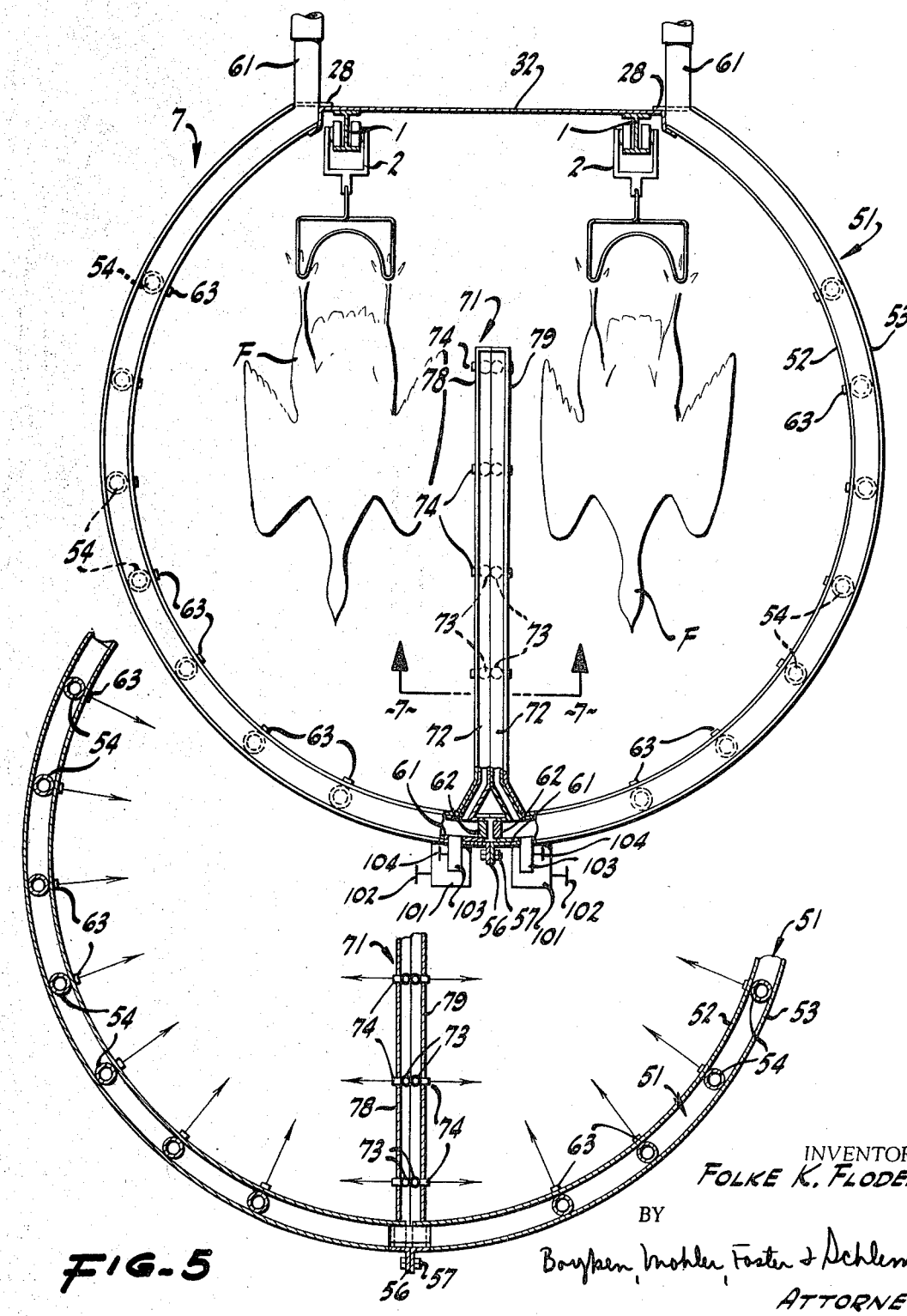

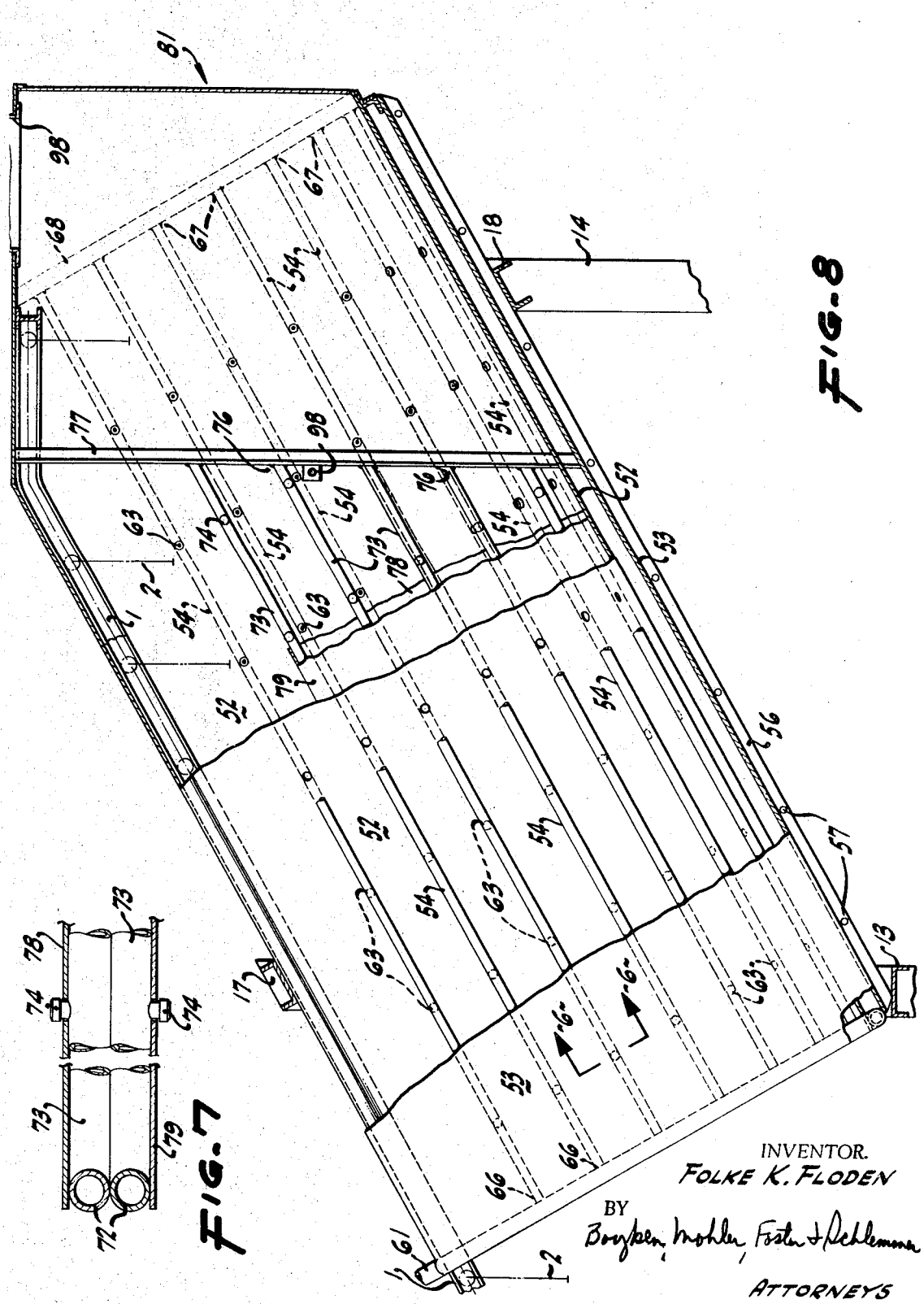

3,561,040
SPRAYING APPARATUS AND METHOD FOR USE IN CONJUNCTION WITH FOWL DEFEATHERING APPARATUS
Folke K. Floden, Modesto, Calif., assignor to Food Equipment Inc., Dallas, Tex., a corporation of Delaware
Filed Aug. 2, 1968, Ser. No. 749,804
Int. Cl. A22c 21/04
U.S. Cl. 17—11.2
22 Claims

ABSTRACT OF THE DISCLOSURE

Sanitary apparatus and method for subjecting fowl, such as poultry, to a high temperature vaporized medium, such as steam, to replace the commonly employed procedure of immersing fowl in hot water scalding tanks, prior to defeathering. A compartmented housing, having spray jets on opposite sides of a U-shaped path of travel of the fowl, is inclined at a predetermined angle relative to the horizontal. The housing interior is generally smooth and self-cleaning with only spray nozzles projecting from the inner surfaces thereof. An alternate apparatus embodiment includes duplicate but independent spray systems permitting selective fowl treatment with an unvaporized medium, such as hot water, or a preferred vaporized medium, such as steam.

BACKGROUND OF THE INVENTION

Field of the invention

This invention relates to an apparatus and process for treating fowl, such as poultry, to destroy surface bacteria and to loosen the feathers to facilitate subsequent defeathering on automatic machinery. The present invention obviates any danger of burning the meat tissues of the fowl or coagulating the protein therein during treatment. The apparatus of this invention has been developed to replace highly unsanitary, yet commonly used, equipment for immersing fowl in hot scalding water as a preliminary step to defeathering on automatic machinery. Such immersion has many serious disadvantages enumerated hereinafter which are widely recognized yet which, to the present time, have not been rectified in commercial operations.

The subject apparatus comprises a self-cleaning housing structure through which a fowl conveyor passes in a predetermined path. A spray nozzle system for discharging a sterilizing and feather loosening medium against each fowl carried on the conveyor is provided in the housing, and means for effecting accurate temperature control and the elimination of hot spot pockets is provided to insure effective feather loosening without danger of fowl damage. The housing is inclined relative to the horizontal to insure most effective operation of the apparatus.

Description of the prior art

Heretofore known commercial operations of fowl feather loosening preparatory to mechanical picking have involved the immersion of the fowl, suspended from an overhead conveyor, in a tank of hot scalding water. Such a procedure is expensive and has numerous other disadvantages well known in the trade, of which the following are illustrative.

The scalding water is rapidly contaminated by a residue of accumulated filth in the tank, even though fresh water is continuously introduced thereinto, thereby prompting the necessity for the tank to be drained and cleaned regularly and at short intervals, such as the end of each eight hour shift of operation. Cleaning necessitates shutting down of the processing line and attendant loss of production time and attendant labor expenses for cleaning.

Even with repeated tank cleaning, the immersion process is ineffective in killing surface bacteria, such as Salmonella, because the scalding water in the immersion tank cannot be heated above a temperature of about 140° F. because of the danger of cooking the fresh poultry at higher temperatures. It is well known that Salmonella treatment must take place above 155° F. to be effective. The fowl commonly ingest contaminated water during passage through the immersion tank, thereby contaminating the interior of the fowl also. Furthermore, further contamination results following immersion by contact of the fowl with mechanical picking fingers which strike, with considerable force, the surface of the fowl during picking. Such picking fingers drive bacteria from contaminated water carried by the fowl into the meat of the fowl.

As a practical matter, immersion is generally effective in loosening fowl feathers for picking but is totally ineffective in bacteria control. Despite such well recognized illustrative deficiencies of the immersion procedure enumerated above, immersion is widely and exclusively used in present commercial fowl defeathering operations.

Certain prior art has recognized deficiencies in the immersion process and disclosures exist directed to non-immersion procedures for preparing fowl for defeathering. Pats. No. 2,152,082 and No. 2,152,083, both granted to P. Onorato et al. on Mar. 28, 1939, describe generally the treatment of fowl with stream spraying apparatus. However, so far as is known, the Onorato et al. type apparatus has not seen commercial usage; nor does such apparatus employ the novel and improved features of the apparatus disclosed herein.

More recently, an improved fowl defeathering apparatus and method employing a vaporized steam spraying procedure were developed by the present applicant and his associate as disclosed in Roth and Floden Pat. No. 2,972,167, dated Feb. 21, 1961, and Pat. No. 3,074,103, dated Jan. 22, 1963.

The apparatus and method disclosed in the Roth and Floden patents have been proved effective from both the standpoint of providing an economical feather loosening process and also one which effectively overcomes the sanitation shortcomings of the standard immersion process. However, the unique construction of the Roth and Floden apparatus, and the generally upright construction of the spray housing employed therein, and the special conveyor employed therewith, require special installations. Therefore, commercial acceptance of those patented inventions has been somewhat slow in coming about, due primarily to the hesitancy of the trade to undergo the expense of substantially modifying existing fowl processing lines and facilities to incorporate therein the improved and effective apparatus of the Roth and Floden patents.

The apparatus of the present invention has been specifically designed to retain certain characteristics and desirable features of the Roth and Floden apparatus and to incorporate the same with improved features disclosed herein into a simplified apparatus which may be substituted as a single unit in an existing fowl processing line in place of an immersion tank and without requiring any other substantial modification of the line. The present apparatus may be inserted in an existing processing line in a matter of a few hours, such as during the night when the line is normally shut down, at minimum expense and without substantial redesign of the line as required with heretofore suggested steam treating apparatus.

SUMMARY OF THE INVENTION

The present invention relates to an apparatus and method or process for preparing fresh killed fowl, such as poultry, for a mechanical defeathering operation by available defeathering apparatus. More particularly, this invention relates to a fowl defeathering apparatus and process using a high temperature medium, which preferably is of the vaporized type but which in an alternate embodiment may be of the nonvaporized type. Still more particularly, this invention relates to an apparatus for subjecting fowl passing along an enclosed path to the feather releasing effects and bacteria killing effects of a high temperature spray medium in a sanitary environment. Such apparatus is specifically intended to replace the conventional unsanitary immersion tanks in which fowl have heretofore been treated prior to defeathering.

Still more particularly, this invention relates to a steam treating apparatus or vaporizer for fowl which is positioned in advance of a mechanical defeathering apparatus in a continuous fowl defeathering line. The fowl are carried on any suitable conventional overhead conveyor through the apparatus and a high temperature fluid medium, such as steam, is directed against and surrounds the fowl to effectively kill surface bacteria on the bodies and feathers thereof, and to create a humidity sufficiently high to open the follicles of the fowl to loosen the feathers without danger of burning the meat tissues or coagulating the protein of the fowl.

The apparatus of this invention is an improvement over prior known vaporizers in that the apparatus housing through which the fowl are transported extends upwardly at a predetermined angle relative to the horizontal. The angle of inclination most effectively is chosen within the range of approximately 10° to approximately 40° relative to the horizontal, with an angle within the range of approximately 25° to approximately 35° being preferred. An angle of approximately 30° has been determined as very effective. The upward inclination of the housing of the apparatus to be described in detail is important in that it insures normal convection currents which eliminate hot spot pockets along the path travelled by the fowl, thereby essentially eliminating the danger of fowl burning during treatment. Such inclination also permits the subject apparatus to be substituted in existing fowl processing lines in place of imersion tanks heretofore used without requiring modification of such lines other than the substitution noted. Self-cleaning of the apparatus also is enhanced by such inclination.

With heretofore proposed vaporizing units, of the types disclosed in the Roth and Floden patents or the Onorato patents mentioned previously, special and substantial modifications of existing lines would be necessary. In the case of the Onorato structures, the incompatibility of such apparatus with existing lines would make substantial redesign necessary. Also, in the case of the Roth and Floden structure, the upright housing cannot always be incorporated into existing lines because of the low ceilings of most buildings in which the lines are housed. The height of the upright housing frequently makes modifications to the building structure in which such lines are housed necessary. The present apparatus encounters no height or redesign problems of the type noted.

The subject apparatus further includes means for insuring accurate temperature control within the vaporizer housing so that a desired temperature, and accordingly, effective feather loosening without danger of meat burning, may be insured. Such control means incorporates provisions for admitting ambient air into the housing and its passage from the lower towards the upper end thereof for effecting rapid temperature change as required for exact temperature control. Temperature monitoring mechanisms are provided to automatically regulate the control means to maintain the internal temperature of the housing in accordance with a predetermined desired level.

From the foregoing, it should be understood that objects of this invention include: the provision of an improved apparatus and process for destroying surface bacteria on fowl, such as poultry, while simultaneously loosening the feathers thereof to facilitate subsequent defeathering thereof; the provision of an apparatus and process capable of loosening fowl feathers without attendant danger of cooking or scalding the meat or coagulating the protein thereof; the provision of an apparatus for treating fowl which may be substituted for conventional hot water scalding immersion tanks presently in common use; the provision of such an apparatus which may be readily substituted for hot water immersion tanks without requiring additional floor space or other modifications of the fowl processing line or the building in which such line is housed; the provision of an apparatus and method for loosening fowl feathers by spraying a high temperature medium thereon in which the fowl are transported along an inclined path during such spraying to substantially eliminate danger of temperature hot spots along such path; the provision of an apparatus for high temperature treatment of fowl in which the apparatus is upwardly inclined at a predetermined angle for insuring effective treatment; the provision in an apparatus for spray treatment of fowl with a high temperature medium in which means is included for maintaining close temperature control within the housing of the apparatus; and the provision of a fowl spraying apparatus which is self-cleaning and sanitary throughout.

These and other objects of this invention will become apparent from a study of the following detailed disclosure in which reference is directed to the appended drawings.

DESCRIPTION OF THE DRAWINGS

FIG. 1 is a plan view, schematic in nature, of the subject apparatus and the path of travel of a series of fowl to be treated thereby.

FIG. 2 is a side elevational view of the apparatus illustrating the upward incline imparted to the main housing thereof.

FIGS. 3, 4 and 5 are sectional views, illustrated in different scales, through the apparatus taken in the planes of lines 3—3, 4—4 and 5—5 respectively of FIG. 2.

FIG. 6 is a generally vertical sectional view through the wall structure of the housing of the apparatus taken in the plane of line 6—6 of FIG. 8.

FIG. 7 is a horizontal sectional view, through the divider spray structure which runs longitudinally of the apparatus, taken in the plane of line 7—7 of FIG. 4.

FIG. 8 is a side elevational view of the apparatus cut away in various stages to illustrate details of internal construction thereof.

DESCRIPTION OF THE PREFERRED EMBODIMENTS

As noted previously, the apparatus described in detail has been developed for the specific purpose of replacing the heretofore known and widely used, yet equally widely criticized, hot water immersion scalding tanks for fowl prior to defeathering. Elimination of such immersion tanks and their replacement by the subject apparatus results in a much more sanitary product produced at a substantial savings in cost.

The disadvantages and shortcomings of the conventional immersion scalding tank are widely known and include those illustrative disadvantages listed herein previously, plus others. Perhaps the most important disadvantages of the present immersion procedure is its inability to destroy surface bacteria commonly associated with fresh killed fowl, and its usual result that contaminated water is ingested by the fowl. Because the fowl must be immersed for a substantial period of time to effectively loosen their feathers, commonly about two minutes in most processing lines, the temperature of the hot water in the tank must be kept at a moderate level to prevent cooking the fowl while the feathers are being loosened. As noted previously, such water temperature is substantially below the temperature of approximately 155° F. which is required to kill Salmonella bacteria. It is during such immersion time that the fowl ingest substantial amounts of filthy water which produces the unsanitary result noted previously.

Additionally, with immersion tank lines, upon conveyor breakdown, which occasionally results, all birds at the time of breakdown which are positioned within the immersion tank become cooked and, as a result, are lost for further use and must be discarded. Similarly, if the shackles from which fowl are suspended from the conveyor release or break during operation, fowl carried thereby are dropped into the tank and also become cooked and unusable. This loss of usable fowl over a period of time results in substantial monetary loss to the processing line operator which is substantially eliminated with this invention.

Because the flow of spray medium with the present invention may be shut off automatically and immediately upon any conveyor breakdown, fowl within the present apparatus are not lost for further use. Similarly should a shackle of the conveyor break while such shackle is positioned within the spraying apparatus, the fowl will fall to the bottom of the apparatus from which it frequently may be removed without substantial damage. Also, the spraying medium used with the subject apparatus may be produced at lower cost and is used in smaller quantities than the scalding water in the immersion tank procedure. Other economies may be recognized in reduced equipment capital costs, maintenance costs, and labor costs, as well as in reduction in plant floor space requirements and the savings attendant thereto.

With the subject invention, the enumerated disadvantages of the immersion tank procedure are eliminated, thereby resulting in the substantial economies noted while at the same time insuring the production of a much more desirable and greatly more sanitary product.

With the foregoing background and advantages of this invention in mind, reference is directed to the drawings for an illustration thereof.

Referring first to the generally schematic showing of FIG. 1, the path of travel of a series of fowl F to and through the apparatus of this invention is illustrated. Such path extends in a predetermined direction determined by the placement of a conventional overhead roller-chain conveyor, generally designated 1, from which fowl are suspended by shackles 2, closely spaced relative to each other for most efficient operation. In a conventional line, such shackles are spaced on approximately seven inch centers to minimize waste space between adjacent fowl. The present invention is capable of maintaining the standard shackle spacing of conventional conveyors while simultaneously producing the improved results disclosed herein.

The fowl being processed are positioned in sequence on the shackles 2 of the conveyor 1 in the killing room and pass therefrom into the subject apparatus along the path and in the direction indicated in FIG. 1. Preferably, depending upon the type of fowl being treated, prior to entry into the main housing of the spraying apparatus, the fowl are carried through a prerinse spray housing 3 between series of vertically spaced spray nozzles positioned therein. This initial spray treatment may be effected by unheated clean water, although medium temperature water in the range of approximately 80° to 125° F. may be used. The purpose of the prerinse spray is to wash loose feathers, dirt and other debris from the fowl prior to their entry into the main housing of the apparatus. Such debris and the wash water fall into an open drain trough 4 which extends under the apparatus and along which such debris may be washed away in known fashion.

Following such prewashing, the conveyor introduces the fowl through an entering end 6 of the main housing, generally designated 7, of the apparatus. The fowl pass through the housing in a U-shaped path prior to their discharge from the exit end 8 of the housing. During such passage through the housing, the fowl are sprayed from both sides and are completely surrounded by a high temperature medium in the manner to be described.

Following spray treatment in the subject apparatus, which kills bacteria thereon and loosens their feathers, the fowl are carried on the conveyor from the apparatus for further processing. Preferably, the fowl are introduced directly and immediately into an adjacent mechanical defeathering apparatus 9 of any suitable type while the fowl are still directly reacting to the effects of the spraying medium. Most desirably, the defeathering apparatus 9 is connected directly to the exit end 8 of the main spraying apparatus housing 7 as a continuation thereof, although it should be understood that other arrangements also may be employed to meet particular needs. Following treatment in the defeathering apparatus, the fowl are then conveyed to other areas of the processing plant for further handling in known fashion.

Referring now to FIGS. 2 and 3, the construction of the subject apparatus will be described.

Conveyor 1 comprises an overhead I-beam rail along which ride interconnected roller-chain segments of the commonly known type to which are operatively and spacedly connected the shackles 2 mentioned previously. Suspended by their legs from such shackles are the series of fowl F being processed. Such fowl pass on the conveyor from the killing room into the prerinse housing 3.

In the preferred embodiment illustrated, the pre-rinse housing comprises an integral portion of the overall spraying apparatus, which apparatus is defined by the open frame work, generally designated 11, comprising a series of parallel pairs of longitudinally spaced upright standards 12, 13 and 14. The standards 13 and 14 are of progressively increasing height, as seen in FIG. 2, to accommodate and impart the upward inclination to the main spray housing 7 of the apparatus. Extending transversely between the standards 12 and 13 and welded in place at the bottoms and tops thereof respectively are brace members 16 and 17, several of which are seen in FIGS. 2 and 3. Other braces 18 and 19 extend transversely between and are welded to the standards 14 intermediate the opposite ends and adjacent the upper ends thereof respectively as seen in FIG. 2.

An upper longitudinal brace 21 extends the length of the apparatus, and a series of downwardly inclined braces 22, 23, 24 and 26 are secured by welding between the longitudinal brace and the respective standards at each side of the apparatus. A lower longitudinal brace 27 extends the length of the apparatus and is welded to the respective upright standards. Other longitudinal but inclined brace structures 28 extend above the main housing of the apparatus for the length thereof and at the predetermined incline to be described. Such brace structures 28 terminate in a generally horizontal section 29 secured by welding in turn to the upright standards 19 as best seen in FIG. 2. The framework is completed by a generally upright brace 31 which extends between the upper longitudinal brace 21 and the just mentioned horizontal section 29 of the brace structure 28.

Thus, upon welding all components together as noted, the apparatus is imparted with a rigid framework which supports both the main housing 7 thereof and the prerinse housing 3 thereof, plus the conveyor 1 and the load of fowl carried thereby.

As best seen in FIGS. 2 and 4, the rails of the conveyor 1 are mounted along the top of the prerinse housing 3 and the main housing 7 and are secured by welding or the like to supporting plates 32 and 34 which extend transversely of the housings, form the roofs thereof, and in turn are secured to the supporting framework described in any suitable manner, such as by welding.

The prerinse housing as best seen in FIG. 2 is comprised of parallel spaced sheet metal walls 33, preferably defined by stainless steel panels, and the aforementioned sheet metal roof plate 34 which extends transversely between the walls and is secured thereto and to the framework described previously in any suitable fashion such as by welding. The walls of the prerinse housing preferably extend to or closely adjacent to the floor 36 of the building in which the apparatus is positioned thereby defining an open-ended passage therethrough.

Adjustably positioned within the prerinse housing on opposite sides of the path defined by the conveyor are laterally spaced spray structures 37 and 38 (FIG. 1), each of which is defined by a series of three or more vertically spaced, longitudinally extending spray pipes 41, 42 and 43 (FIG. 2), each of which in turn has a plurality of spray nozzles spacedly located therealong at approximately eight-inch intervals, as schematically shown in FIG. 1. The respective spray pipes, which may vary in size with ¾ inch pipe being suitable, are supported at or adjacent their ends by upright spaced standards 44 and 46, standard 44 being hollow and forming the inlet for the prerinse water introduced into the respective spraying pipes. Each of the spraying pipes at one of their ends is threadedly or otherwise engaged with the hollow inlet standard 44. The opposite end of each of the pipes is closed and is supported by and secured to standard 46 in any suitable fashion, such as by welding.

Each inlet standard 44 of each of the spaced spray structures 37 and 38 is connected in any suitable fashion, such as a flexible length of hose 47, to a source of rinse water supply, indicated by pipe 48. A shutoff control valve 49 preferably is interposed between the source of supply and the respective spray structures for the obvious purpose.

For most effective prerinsing of fowl introduced into the main housing of the apparatus, lateral adjustability of the spray structures 37 and 38 relative to each other is preferred so that the spacing therebetween may be varied, depending upon the size of the fowl being treated, with closer spacing being desirable for smaller birds such as chickens and greater spacing being preferred for larger birds such as turkeys. In the embodiment illustrated, simple adjustment structure is provided as defined by weighted bases 48 and 49 in which the respective standards 44 and 46 are received. Thus, to adjust the spacing between the spray structures, it is merely necessary to move the bases and the spray structures carried thereby inwardly or outwardly as required.

Other means of adjustment not shown could be employed if preferred, such as a screw crank operated structure supported by the apparatus framework and operatively connected with the respective spray structures 37 and 38. Upon actuation of such a crank structure, the spray structures 37 and 38 would be mechanically driven toward or away from each other as desired.

It has been found that, for most effective spray medium distribution and control, the main housing 7 should be generally circular in transverse cross section. As best seen in FIGS. 3 and 4, departure from the circular configuration may occur along the upper extent of the housing, where plate 32 defines the housing roof, without affecting the effectiveness of the apparatus. Plate 32 and the wall 51 of the housing are defined by sections of sheet metal, preferably stainless steel, joined together by welding or other suitable means into a continuous skin. Preferably, wall 51 is defined by spaced inner and outer skin layers, 52 and 53 respectively, between which circumferentially spaced, longitudinally extending spray medium supply pipes 54 extend. Pipes 54 preferably are secured to the inner and outer skins 52 and 53 in any suitable fashion, such as by welding, so as to be rigidly supported in the wall structure. If desired, the space between the inner and outer skins of the housing wall may be filled with a suitable insulating material, such as glass fiber matting, to enhance the temperature control characteristics of the apparatus.

The skins of the housing walls, as seen in FIG. 4 are secured along their upper edges, such as by welding, to the aforementioned upper roof plate 32 of the housing. Along their adjacent lower edges, the outer skins 53 of the housing wall have secured thereto angle brackets 56. Brackets 56 are welded to the respective skin sections and are secured together by bolt and nut structures 57 at spaced location along the length of the housing to maintain the opposed housing wall sections integrally connected.

At the lower end of the inclined housing, the skins 52 and 53 of the housing wall are secured to two arcuate pipe sections each designated 61 and each having a closure plug 62 in its lower extremity as seen in the cut away portion of FIG. 4. As seen in FIGS. 2 and 3, a manifold structure connects the respective pipe sections 61 with a spray medium supply source, designated by pipe 58. Flow from such source is controllable by shutoff valves 59 of conventional construction as desired to meet operating conditions. Pressure gauges 60 are interposed between the shutoff valves and the housing for the well known purpose. Thus, the spraying medium to be applied to the fowl carried through the housing passes from the supply pipe 58 through the manifold structure into the upper ends of pipe sections 61 into and through the longitudinally extending spray pipes 54.

The presence of the inner stainless steel skin 52 of the housing wall is important and is specifically provided to impart a generally smooth inner periphery to the housing wall. As noted from FIG. 8, each of the supply pipes 54 is provided with a series of longitudinally spaced spray nozzles 63 from which emanates, at the desired pressure and in the proper direction, the spray medium being employed. Each nozzle, as best seen in FIG. 6, is threadedly connected with its associated supply pipe 54 by means of a screw fitting 64 which extends through the inner skin 52 of the housing wall. Thus, only the head 65 of the nozzle 63 projects slightly inwardly of the housing wall so that a generally smooth substantially circular inner periphery is retained. Each of the nozzle heads 65 is threadedly connected with the inner end of its associated fitting 64 so that the head may be removed for cleaning or replacement as necessary.

Because of the generally smooth inner periphery of the housing wall produced by the construction described, the self-cleaning characteristics of the housing are greatly enhanced because no sharp projections or protuberances exist on which foreign matter can become caught. In practice it has been found that seldom is cleaning, other than by operating the apparatus under normal conditions, necessary.

It should also be understood from FIG. 8 that all of the longitudinal supply pipes 54 at their lower ends 66 are threadedly engaged with or welded to an associated arcuate supply pipe section 61. However, at their upper ends 67, all of the pipes 54 are welded in leak proof fashion to a circular ring 68 having a planar surface. Such ring defines the upper end of the housing and is secured to the aforementioned framework of the apparatus in any suitable fashion, such as by welding.

It should be noted from FIGS. 4 and 5 that the nozzles 63 are oriented to project through the inner skin of the housing wall for most effective distribution of the spraying medium and application to the fowl passing through the housing. The nozzles direct the medium in converging fashion to fully cover each fowl passing therepast. As noted the lower nozzles in the housing are upwardly directed with the intermediate nozzles being generally horizontally directed while the upper nozzles are downwardly directed.

The size and spacing of the nozzles and supply pipes employed obviously may vary to meet particular needs and requirements. However, by way of illustration, effective results have been obtained with supply pipe sections 61 of two inch diameter and supply pipes 54 of one-inch diameter, nozzles 63 being positioned on the latter on eighteen inch centers, and pipes 54 being secured to pipe sections 61 on ten inch centers.

To further insure effectivet reatment of each fowl by subjecting all portions thereof to the direct action of the spraying medium applied thereto, an intermediate divider spray structure, generally designated 71, is provided to extend longitudinally of the housing for substantially its full length. Note FIGS. 4, 5 and 8. The divider spray structure at its lower end comprises two back-to-back upright feeder supply pipes 72 which are secured by screwing or welding in direct communication with the arcuate supply pipe sections 61 as seen in FIG. 4. Extending longitudinally from and threaded or welded to the feeder pipes 72 are vertically spaced series of back-to-back spray pipes 73 (FIG. 8) from which project spray nozzles 74 of the type described previously. Nozzles 74 are oriented to discharge the spraying medium generally horizontally with the medium spreading as it emanates from the nozzle for effective distribution thereof along the length of the body of the fowl passing thereby.

Referring again to FIG. 8, the upper ends 76 of spray pipes 73 are welded in leak proof fashion to a pair of back-to-back angle braces 77 which extend between the top and bottom of the housing and are secured therein in any suitable fashion, such as by welding. Thus, the divider spray structure 71 is supplied from the same source as the spray pipes 54 in the housing wall. Preferably, feeder pipes 72 and spray pipes 73 are of the same size as pipes 54 and the nozzles 74 are spaced along pipes 73 in accordance with the nozzle spacing on pipes 54.

For the same purpose mentioned previously, the longitudinally extending spray pipes 73 are covered by sheets of stainless steel, 78 and 79, so that only the heads of nozzles 74 project therebeyond. Such sheets enclose the spray pipes 73 and the feeder pipes 72 and are secured in place in any suitable fashion, such as by welding, so that the opposite surfaces of the divider spray structure 71 are generally smooth to further enhance the self-cleaning characteristics of the apparatus. Thus, the divider structure 71 separates the main housing 7 into two discrete compartments through which the fowl pass along the U-shaped path seen in FIG. 1. However, as noted from FIG. 4, the divider structure extends only the major portion of the height of the housing to provide an upper communicating passage along the roof of the housing through which spraying medium may pass from one housing compartment to the other.

From the foregoing, it should be understood that fowl passing on the conveyor through the housing are subjected to uniform spraying both during the upwardly inclined portion of their passage through the housing on the first leg of their U-shaped path, and also during the downwardly inclined portion of their passage toward the exit end of the housing on the second leg of such path of travel.

At its opposite upper and lower ends, housing 7 is substantially closed to permit effective temperature and humidity regulation and control therein. At the housing upper end, as seen in FIGS. 2 and 8, a sheet metal hood 81 is secured by welding or bolting to the aforementioned ring 68, enclosing the end of the housing. At the housing lower end, as seen in FIG. 3, a generally circular cutout plate 82 is secured by welding or bolting to the supply pipe sections 61 and to the apparatus framework. Cutout plate 82 and hood 81 cooperate to effectively control the entry of ambient air into the housing during operation of the apparatus.

As seen in FIG. 3, plate 82 is provided with means to permit entry and exit of fowl relative to the housing. In that regard, the plate includes a pair of spaced open cutouts 83 and 84 of a size and contour which permit passage therethrough of the shackles 2 moving along the conveyor 1. Below the open cutouts 83 and 84 and forming extensions thereof are enlarged cutout portions in which are positioned spaced door structures 86, each of which is defined by a plurality, preferably four, hinged door sections 87 which together are of a size sufficient to permit the passage of a fowl therethrough. The weight of the fowl and movement thereof with the conveyor swings the door sections 87 inwardly or outwardly depending upon the direction of movement of the fowl as the same moves relative to the plate 82. Thus, except when fowl are passing through the door structures, the lower end of the housing is substantially closed to effectively retain the spraying medium within the housing.

The hood 81 at the upper end of the housing provides means for rapidly rectifying unwanted changes in temperature within the housing beyond well defined predetermined limits. To that end, the hood is provided in its top with an exhaust stack 91 which passes through the roof (not shown) of the building in which the apparatus is located. Structure for regulating passage of air and spraying medium therewith through the stack is provided in the stack. In the preferred embodiment illustrated, such structure comprises a butterfly damper 92 (FIG. 2) pivotally positioned across the stack for selective movement to positions of greater or lesser stack closure.

Damper 92 is actuated through connecting means, comprising a link 93 and a push-pull rod 94, by power source drive means, comprising an electric motor 96 mounted on the upright standard 14 of the apparatus framework adjacent hood 81. The electric motor in turn is actuated by a potentiometer 97 mounted on a control panel 98 adjacent the side of the housing so as to be readily accessible to the operator of the apparatus. Other controls for the apparatus are similarly located on the control panel mentioned.

The position of damper 92 is regulated by the motor through the potentiometer which in turn is governed by a finely graduated thermometer 98 (FIG. 8) located within the housing, preferably on the divider spray structure 71 therein at the upper end thereof where the fowl change from the upward to the downward path of travel within the housing. Conventional electric wiring (not shown) connects thermometer 98 with the potentiometer control so that, upon variation of the internal temperature of the housing from a predetermined setting desired, signals are transmitted to the electric motor to either increase or decrease the amount of stack opening permitted by damper 92. Such increase or decrease is effected by the motor rotating and actuating the connecting means described. That is, push-pull rod 94 is operatively connected with an eccentric link secured to the drive shaft of the motor so that rod 94 is pushed or pulled in response to the direction of movement of the eccentric link by the motor. The direction of movement of the motor drive shaft is determined by the potentiometer in response to the temperature variant sensed by the thermometer in the housing. The connection between the eccentric link and the motor is conventional and has not been illustrated in detail.

Experience has shown that with the temperature control means described, the internal temperature of the housing may be closely governed within finely graduated predetermined limits which may be held to a range of variance of as little as one or two degrees from the predetermined fowl treating temperature chosen. For example, for the treatment of chickens, it has been found that, depending upon their quality, an internal housing temperature in the range of 160° to 175° F. is very effective for bacteria destruction and loosening of feathers. Such temperature may be rigidly controlled. For example, tests have shown that if a treating temperature of 170° F. is desired, the internal housing temperature may be held within the range of 170°–172° F. from a point one or two feed from the entrance end 6 of the housing to a point one or two feet from the exit end 8 of the housing. That is, for substantially the full path of travel of the fowl through the housing, they are subjected to a substantially constant and uniform predetermined temperature, chosen as most effective for the treatment of the particular quality and type of fowl being handled.

The temperature sensing and control means employed, upon sensing an undesirable increase in the internal temperature in the housing, reacts to activate motor 96 as described to open damper 92 and permit the entry of ambient air through the cutout plate 82 at the lower end of the housing. Such ambient air is drawn into the housing by convection and rapidly passes upwardly, along both sides of the divider structure 71, due to the draft created by the opening of the damper, into and through stack 91. Such air flow is in the same direction as the fowl in one segment of their path and in an opposite direction for the other segment of their path. Such air passage rapidly reduces the temperature to the desired level, which condition is then sensed by the thermometer 98 to reverse the cycle described to close the damper. Upon such temperature reduction being effected, the damper is held at the proper position to maintain the temperature setting desired.

As best seen from FIG. 2, housing 7 is provided with a substantial degree of upward inclination from one end towards the other end. Such inclination may vary within certain preferred limits so long as the angle chosen permits the rapid upward flow of ambient air as just described. Also, the inclination chosen is substantially less than vertical so that the housing will conserve floor space and yet will permit the subject apparatus to be positioned in buildings having normal height ceilings. In that regard, an inclination in the range of from approximately 10° to approximately 40° relative to the horizontal has been determined as necessary for meeting the stated needs and to permit the apparatus to perform all its desired objectives. An inclination falling within a narrower range of approximately 25° to 35° has been found most preferable with an inclination of approximately 30° being highly effective for insuring close temperature control while permitting the apparatus to conserve floor space when installed and without creating any necessity to alter or raise the roof of a conventional building in which the apparatus is installed in place of an immersion tank in an existing fowl processing line. Also, such inclination produces the desired results without adjacent fowl contacting each other and without requiring any modification in the shackle spacing of a conventional conveyor. The lower angles noted are preferred for longer machines operated at higher conveyor speeds.

The inclination of the housing has further advantages in the nature of effective spraying medium distribution along its length and in the self-cleaning aspects of the apparatus. Such inclination insures that the vaporized medium, steam for example, will pass upwardly along both sides of the housing toward stack 91 due to the draft created thereby. This draft keeps the medium moving and prevents formation of hot spots in the housing, without requiring expensive circulation equipment for that purpose. Also, the inclination insures that feathers or other debris which may be inadvertently carried into the housing on the fowl and which are removed from the fowl therein will flow downwardly with condensed liquid toward the lower end of the housing.

To permit removal of any such debris aid condensate from the housing, drain structures in the form of depending enlarged pipes 101 are positioned to extend through the wall of the housing on opposite sides of the divider spray structure 71, as best seen in FIGS. 3 and 4. Such pipes open into the drain trough 4 mentioned previously. If desired, flow control valves 102 may be positioned in the drain pipes to permit the same to be closed or opened selectively.

Furthermore, as also seen in FIGS. 3 and 4, the inclination of the housing imparts a futrher advantage to the apparatus in that it becomes unnecessary to blow out the spraying system prior to introduction of a vaporized medium thereinto. Upon the apparatus shutting down, such as at the end of a shift for example, a condensed vaporized medium in the respective spray pipes will drain by gravity into the arcuate supply pipe section 61 at the lower end of the housing. Such condensate may be then drained into the trough 4 through a second set of drain pipes 103, each of which is valve controlled by a drain valve 104 as seen in FIG. 3. Thus, when the apparatus is prepared for use, to insure only vaporized medium is present in the spray pipe system, it is merely necessary to open the control valves 104 to let any condensate drain from the pipes therein, and to then reintroduce a new supply of vaporized medium thereinto. Thus, the present apparatus is provided with substantially instantaneous operating capability.

In this regard, as noted previously, the vaporized medium employed preferably is in the form of steam, the temperature of which above 212° F., is regulated to produce the predetermined internal housing temperature desired for most effective processing of the fowl being treated. By way of example, saturated steam at approximately 300° F. and at seven to ten p.s.i. has been found very effective for treatment of chickens. Steam pressure and rate of flow may be regulated and varied in accordance with known concepts to porduce the most effective results. Although not specifically shown in the drawings, the steam flow to the housing through the manifold supply pipe 58 preferably is regulated by an electric motorized steam valve, the position of which is controlled by and correlated with the speed of the conveyor chain and further limited by the housing temperature limit control means described previously. That is, the steam flow to and through the respective spray nozzles is controlled precisely and correlated with the speed of the conveyor in accordance with production needs. Such control also effects immediate stoppage of spraying medium flow upon stoppage of the conveyor to prevent cooking of fowl in the housing when the conveyor stops.

By way of further example, a commercial housing as illustrated herein is approximately twelve feet in length so that fowl passing therethrough travel approximately twenty-five feet through the housing in the U-shaped path shown. At conventional conveyor speeds of approximately twenty-five feet per minute, each fowl is subjected to the steam treatment described for approximatel yone minute. Treatment at the illustrative speed, time and temperature noted has been highly effective for the desired bacteria killing and feather loosening results sought for fowl, such as chickens, in a highly sanitary environment.

An alternate embodiment of this invention resides in the duplication of the spray pipe system shown for the purpose of imparting hot water spray capability to the apparatus. Although the duplicate system mentioned has not been illustrated in the drawings, it should be understood that parallel spray pipe and nozzle systems identical in all essential respects to that illustrated in the drawings would be provided in the main housing so that high temperature but unvaporized water could be employed to wetspray fowl passing through the apparatus. While a nonvaporized wet spray is less preferable than the steam spray processing described, such a wet spray has utility with the treatment of certain fowl and is contemplated within the scope of this invention. Duplication of the spray pipe and nozzle systems shown to provide both vaporized and nonvaporized spray capability is preferred to attempts to incorporate both vaporized and nonvaporized spray potential into the same set of spray pipes.

Furthermore, such a duplicate set of hot water spray pipes preferably included in commercial embodiment of this apparatus further facilitates cleaning of the apparatus when periodically desired in that hot water may be passed through the spray pipes and nozzles for brief periods to effect complete cleaning of the housing interior. Such spray water will pass out through the drain pipes 101 mentioned previously.

Also, it has been found desirable to provide a compressed air source (not shown) in communication with the respetcive portions of the spraying system so that air may be passed through the respective spray nozzles when spraying medium is not passing therethrough. Such air passage permits each nozzle to be checked periodically for possible blockage as required.

Having thus made a full disclosure of this invention, which is intended to be illustrative rather than limiting, reference is directed to the appended claims for the scope to be afforded thereto.

What is claimed is:

1. For use in conjunction with fowl defeathering apparatus, spraying apparatus comprising:
   (A) an enclosed housing through which fowl may be carried along a predetermined path.
   (B) a conveyor supported in said housing defining said predetermined path and having shackle means thereon for suspending fowl in spaced relationship therealong,
   (C) spray means extending along said housing on opposite sides of said path for directing a steam spraying medium against said fowl to loosen the feathers thereof and to destroy bacteria carried thereby, and
   (D) temperature control means communicating with the interior of said housing for regulating the entry of ambient air into said housing to create a controlled draft through said housing for maintaining the temperature in said housing within well defined limits.

2. For use in conjunction with the treatment of animal carcasses, spraying apparatus comprising:
   an enclosed housing through which the carcasses may be carried along a predetermined path, said housing supported to extend upwardly from the point of entry of said conveyor thereinto at an angle within the range of approximately 10° to approximately 40° relative to the horizontal,
   a conveyor supported in said housing defining said predetermined path and having shackle means thereon for suspending carcasses in spaced relationship therealong,
   spray means extending along said housing on opposite sides of said path for directing a high temperature spraying medium against said carcasses for treatment thereof and to destroy bacteria carried thereby, and
   temperature control means communicating with the interior of said housing for regulating the entry of ambient air into said housing for maintaining the temperature in said housing within well defined limits, said temperature control means including damper structure positioned at the upper end of said housing to insure passage of ambient air upwardly through said housing toward said damper structure when such structure is opened to preclude hot spot pocketing within said housing.

3. The apparatus of claim 2 in which said housing is generally circular in transverse cross section.

4. The apparatus of claim 1 in which said housing includes
   (1) a central divider structure extending longitudinally from adjacent one end thereof to adjacent the opposite end thereof,
   (2) said divider structure partitioning said housing into two generally parallel compartments,
   and in which said conveyor
   (1) extends above each of said housing compartments to impart a generally U-shaped configuration to said predetermined path along which said fowl are carried,
   and in which said spray means comprises:
   (1) a series of spray nozzles spacedly positioned along the outer wall of said housing, and
   (2) a series of spray nozzles spacedly positioned along each side of said divider structure,
   whereby fowl carried on said conveyor and suspended in said compartments are surrounded therein by said high temperature steam emanating from said series of nozzles.

5. The apparatus of claim 4 in which said housing is
   (3) supported to extend upwardly from the point of entry of said conveyor thereinto at an angle within the range of approximately 25° to approximately 35° relative to the horizontal,
   and in which said temperature control means includes
   (1) damper structure positioned at the upper end of said housing to insure passage of ambient air upwardly through each of said housing compartments toward said damper structure when such structure is opened to preclude hot spot pocketing within said housing.

6. The apparatus of claim 2 in which said housing at its lower end further includes
   (2) a closure plate extending thereacross and substantially closing off said lower end,
   (3) said closure plate having
      (a) cutout portions provided therein, and
      (b) hinged door sections positioned in such cutout portions to permit passage of fowl carried on said conveyor through said closure plate.

7. The apparatus of claim 2 which further includes
   (E) prerinse spray means adjacent the entering end of said housing and along said predetermined path for water spraying said fowl supported on said conveyor prior to introduction thereof into said housing.

8. The apparatus of claim 4 in which the interior of said housing wall and the opposite sides of said divider structure are generally smooth with only the heads of said series of spray nozzles protruding slightly therefrom, whereby said apparatus is substantially self-cleaning during operation.

9. The apparatus of claim 1 in which said spray means comprises:
   (1) a series of spray pipes extending longitudinally of said housing for substantially the full length thereof, and
   (2) a series of spray nozzles spacedly mounted upon and projecting from said spray pipes into said housing,
   and in which said housing is
   (1) supported to extend upwardly from the point of entry of said conveyor thereinto at a predetermined angle substantially less than 90° relative to the horizontal,
   whereby said spraying medium discharged from said nozzles moves upwardly through said housing in response to the draft selectively created by said temperature control means.

10. The apparatus of claim 9 in which said housing further comprises:
    (2) a wall defined by two spaced sheet skins,
    and in which said spray pipes are
    (3) positioned between said housing wall skins,
    (4) said nozzles protruding slightly through the inner of said skins into the interior of said housing,
    (5) said inner skin being otherwise generally smooth to enhance the self-cleaning characteristics of said apparatus.

11. A vaporizing spray apparatus for use in conjunction with a fowl defeathering apparatus comprising:
    (A) an enclosed housing positioned to extend at a predetermined angle relative to the horizontal which is substantially less than 90°,
    (B) an overhead conveyor supported in and extending through said housing along a predetermined path along which fowl are carried,
    (C) spray means supported on opposed wall portions of said housing for directing a vaporized spraying medium such as steam against fowl carried through said housing by said conveyor, and
    (D) means for selectively permitting and regulating the entry of ambient air into said housing to create an upward draft therein as required to regulate the housing internal temperature and to prevent hot spot pocketing therein.

12. The apparatus of claim 11 in which said housing
(1) extends at an angle of approximately 30° relative to the horizontal.

13. The apparatus of claim 11 in which said housing is
(1) generally circular in transverse cross section.

14. The apparatus of claim 11 in which said housing comprises
(1) a generally circular outer wall defined by a pair of spaced inner and outer sheet skins,
(2) the inner of said skins being generally smooth and defining the interior of said housing,
and in which said spray means comprises
(1) a series of longitudinally extending peripherally spaced spray medium supply pipes positioned between said housing wall skins,
(2) and series of spray nozzles communicating with and projecting from said spray pipes in spaced relationship therealong.
(3) only the heads of said nozzles protruding slightly through said wall inner skin so that the generally smooth inner surface thereof is substantially retained.

15. The apparatus of claim 11 which further includes
(E) divider spray structure positioned intermediate said housing, extending longitudinally thereof, and dividing the same into two generally parallel compartments, and in which said conveyor comprises:
(1) an overhead track which enters and leaves said housing from the same end thereof, passes above each of said compartments, and imparts a U-shaped configuration to said path,
said apparatus further including
(F) other spray means on each side of said divider structure for directing said vaporized spray medium toward each portion of said U-shaped path of said fowl on said conveyor.

16. A sanitary method of treating fowl prior to defeathering comprising:
(A) moving said fowl through an enclosed housing along a predetermined path which extends at an upward predetermined angle relative to the horizontal of substantially less than 90°,
(B) while said fowl are moving along said path directing a high temperature steam spraying medium thereagainst from substantially all sides thereof, and
(C) while said fowl are moving along said path inducing a draft of ambient air into said housing in response to the temperature therein to effect controlled flow of said medium in the same direction of movement as said fowl along at least a segment of said path to eliminate hot spot pocketing in said housing along said path segment.

17. The method of claim 16 in which fowl are transported along said path at an angle within the range of approximately 10° to approximately 40° relative to the horizontal.

18. The method of claim 16 in which
(D) said fowl are introduced into and removed from said housing at the same end thereof so that said predetermined path is generally U-shaped within said housing,
(E) said path being divided generally into two segments, one of which extends generally upwardly away from said housing end at said predetermined angle and the other of which extends downwardly toward said housing end at said predetermined angle, and in which
(F) said draft is induced into said housing along both segments of said path from the lower end toward the upper end of said housing so that said fowl move in the direction of said draft during travel along one of said path segments and contra to the direction of said draft during travel along the other of said path segments.

19. The method of claim 16 which further includes
(D) prerinse spraying said fowl with water prior to introduction thereof into said housing.

20. The method of claim 16 in which said fowl are sprayed from substantially all sides and surrounded by saturated steam during their travel through said housing along said predetermined path.

21. A sanitary method of processing fowl to destroy bacteria thereon and to loosen the feathers thereof prior to subjecting the same to a defeathering operation comprising:
(A) transporting a series of fowl arranged in spaced relationship through an enclosed housing along a predetermined path,
(1) said path being generally U-shaped in configuration and having generally parallel segments each of which extends at an angle of approximately 30° relative to the horizontal,
(B) as said fowl travel along each segment of said path, spraying the fowl from both sides with a high temperature vaporized medium such as steam,
(1) the temperature of said medium being sufficiently high to maintain the housing interior at a temperature above 155° F., and
(C) as said fowl move along said path, inducing a draft into said housing in the same direction as the direction of movement of said fowl along one of said path segments and in a contra direction to the direction of movement of said fowl along the other of said path segments,
(1) said draft precluding the formation of hot spot pockets within said housing.

22. A sanitary method of processing animal carcasses comprising:
transporting a series of carcasses arranged in spaced relationship through an enclosed housing along a predetermined path, said path being generally U-shaped in configuration and having generally parallel segments each of which extends at an angle in the range of approximately 10° to 40° relative to the horizontal,
as said carcasses travel along each segment of said path, spraying the carcasses from both sides with a high temperature vaporized medium such as steam, and
as said carcasses move along said path, inducing a draft into said housing in the same direction as the direction of movement of said carcasses along one of said path segments and in a contra direction to the direction of movement of said carcasses along the other of said path segments, said draft precluding the formation of hot spot pockets within said housing.

References Cited

UNITED STATES PATENTS

| 2,607,073 | 8/1952 | Johnson | 17—11.2 |
| 3,074,103 | 1/1963 | Roth et al. | 17—47 |
| 3,138,822 | 6/1964 | Amstad | 17—11.2 |
| 3,320,632 | 5/1967 | Oehring | 17—51 |

LUCIE H. LAUDENSLAGER, Primary Examiner

U.S. Cl. X.R.

17—47, 51

PO-1050
(5/69)

UNITED STATES PATENT OFFICE
CERTIFICATE OF CORRECTION

Patent No. 3,561,040  Dated February 9, 1971

Inventor(s) Folke K. Floden

It is certified that error appears in the above-identified patent and that said Letters Patent are hereby corrected as shown below:

```
Col. 1, line 69, after "such as" insert --at--.
Col. 2, line 27, "stream" should be --steam--.
Col. 8, line 23, after "into the upper ends of pipe sections (
                 insert --and then through pipe sections 61--
Col. 9, line 3, "reatment" should be --treatment--.
Col. 10, line 71, "feed" should be --feet--.
Col. 11, line 62, "aid" should be --and--;
         line 72, "futrher" should be --further--.
Col. 12, line 23, "porduce" should be --produce--;
         line 43, "approximatel yone" should be --approximate
                  one--;
         line 67, "embodiment" should be --embodiments--.
Col. 13, line 1, "respetcive" should be --respective--.
```

Signed and sealed this 10th day of August 1971.

(SEAL)
Attest:

EDWARD M. FLETCHER, JR.
Attesting Officer

WILLIAM E. SCHUYLER, J.
Commissioner of Patent